United States Patent
Carlson

(10) Patent No.: US 11,345,015 B2
(45) Date of Patent: May 31, 2022

(54) OBJECT RETRIEVAL DEVICE

(71) Applicant: Mark Andrew Carlson, Omaha, NE (US)

(72) Inventor: Mark Andrew Carlson, Omaha, NE (US)

( * ) Notice: Subject to any disclaimer, the term of this patent is extended or adjusted under 35 U.S.C. 154(b) by 0 days.

(21) Appl. No.: 16/863,793

(22) Filed: Apr. 30, 2020

(65) Prior Publication Data

US 2020/0361077 A1 Nov. 19, 2020

Related U.S. Application Data

(60) Provisional application No. 62/840,940, filed on Apr. 30, 2019.

(51) Int. Cl.
| | |
|---|---|
| *B25J 1/04* | (2006.01) |
| *B25J 15/00* | (2006.01) |
| *B25J 17/00* | (2006.01) |
| *B25J 15/10* | (2006.01) |
| *B25J 18/02* | (2006.01) |
| *B25J 1/02* | (2006.01) |

(52) U.S. Cl.
CPC . *B25J 1/04* (2013.01); *B25J 1/02* (2013.01); *B25J 15/008* (2013.01); *B25J 15/10* (2013.01); *B25J 17/00* (2013.01); *B25J 18/02* (2013.01)

(58) Field of Classification Search
CPC ..... B25J 1/02; B25J 1/04; B25J 15/008; B25J 15/10; B25J 17/00; B25J 18/02; A47L 25/005; A01M 3/04
USPC .................................................. 294/212, 209
See application file for complete search history.

(56) References Cited

U.S. PATENT DOCUMENTS

| | | | |
|---|---|---|---|
| 3,342,519 A * | 9/1967 | Joeb | H01J 9/006 81/53.12 |
| 3,797,875 A | 3/1974 | Den | |
| 3,936,088 A * | 2/1976 | Williams | B25J 1/04 294/175 |
| 4,575,143 A | 3/1986 | Nast | |
| 4,653,789 A | 3/1987 | McWilliams et al. | |
| 5,553,344 A | 9/1996 | Rosenkrantz | |
| 5,558,377 A | 9/1996 | Blum et al. | |
| 5,924,157 A * | 7/1999 | Barela | B25G 1/06 15/104.002 |
| 6,065,787 A | 5/2000 | Jarosch | |
| 6,877,273 B2 | 4/2005 | Anderson et al. | |
| 7,559,108 B2 * | 7/2009 | Forte | A47L 25/005 15/104.002 |
| 8,240,731 B2 | 8/2012 | Roszak | |

(Continued)

FOREIGN PATENT DOCUMENTS

GB 2386363 B 9/2004

*Primary Examiner* — Dean J Kramer
(74) *Attorney, Agent, or Firm* — Suiter Swantz pc llo

(57) ABSTRACT

An object retrieval device is disclosed. The retrieval device includes a retrieval end, a joint, and an extension arm. The retrieval end includes an adhesive portion and an arm portion. The arm portion includes a set of protrusions and adhesive portion includes surface segmentation. The joint is configured to pivot. The extension arm includes a first set of protrusions disposed at a first end of the extension arm. The first end of the extension arm is couplable to the arm portion of the retrieval end such that the first set of protrusions disposed on the extension arm align with the set of protrusions disposed on the arm portion of the retrieval end to form ridges.

9 Claims, 18 Drawing Sheets

(56) References Cited

U.S. PATENT DOCUMENTS

| | | |
|---|---|---|
| 9,016,739 B2 | 4/2015 | Mondano et al. |
| 9,847,077 B1 | 12/2017 | Laprad |
| 2003/0173788 A1 | 9/2003 | Fussell et al. |
| 2004/0100109 A1 | 5/2004 | Johnson |
| 2013/0047498 A1 | 2/2013 | Keim, Jr. |
| 2017/0020363 A1* | 1/2017 | Bonick .................. B25G 1/04 |
| 2017/0050309 A1 | 2/2017 | Livera |
| 2017/0066138 A1* | 3/2017 | Hawkes ................ B25J 15/008 |
| 2018/0368384 A1* | 12/2018 | Kim ....................... A01M 3/04 |

\* cited by examiner

OBJECT RETRIEVAL DEVICE

CROSS-REFERENCE TO RELATED APPLICATION

The present application claims the benefit under 35 U.S.C. § 119(e) of U.S. Provisional Application Ser. No. 62/840,940, filed Apr. 30, 2019, entitled OBJECT RETRIEVAL DEVICE, naming Mark Andrew Carlson as inventor, which is incorporated herein by reference in the entirety.

TECHNICAL FIELD

The present invention generally relates to a device for object retrieval, more particularly, to a configurable and adjustable device for object retrieval.

BACKGROUND

In various situations an object will be out of reach of a human hand and difficult to retrieve. For example, an object that falls in a small space, or a location that is out of direct eyesight will be difficult to retrieve with a human hand. Retrieval of an object in such a location may also be impractical for a grabbing or grasping device. A different method of retrieving a device in such a situation would be beneficial. As such, it would be desirable to provide an apparatus that addresses the shortcomings of the previous approaches identified above.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. Also, it is to be understood that the phraseology and terminology used herein is for the purpose of description and should not be regarded as limiting. The accompanying drawings, which are incorporated in and constitute a part of the specification, illustrate embodiments of the invention and, together with the general description, serve to explain the principles of the invention.

Reference will now be made in detail to the subject matter disclosed, which is illustrated in the accompanying drawings.

FIGS. 1-5 generally illustrate an object retrieval device 100 for retrieving objects, in accordance with one or more embodiments of the present disclosure.

Broadly, embodiments of the present disclosure are directed to a device for retrieving objects. Additional embodiments of the present disclosure are directed to modifications and configurations of the object retrieval device. In embodiments, the device can be modified with a joint to retrieve an object out of direct eyesight or that is disposed around a corner. The device is further modifiable with various retrieval ends of various shapes, sizes, textures, and segmentations. The device is further adjustable with one or more extension arms to increase the length of the device. Further embodiments of the present disclosure are directed to raised ridges formed by two portions of the object retrieval device at a coupling location of the two portions such that the raised ridges provide a location for securely grasping the device.

The object retrieval device of the present disclosure may be used in numerous situations where an object is out of reach. The object retrieval device of the present disclosure may be utilized in situations including, but not limited to, retrieval of an object that has fallen in a small space, retrieval of an object in a location that is out of direct eyesight, or retrieval of an object in a location that is out of reach by a human. For example, the object retrieval device may be utilized in situations where an object has become disposed in a hole, between a wall and a piece of furniture, behind a side of an object, or in a location that is difficult for a human hand or a grasping device to grip the object. It is noted herein examples given are not limiting and use of the object retrieval device of the present disclosure may be utilized to help retrieve an object in any situation object retrieval is needed.

Figure 1A:
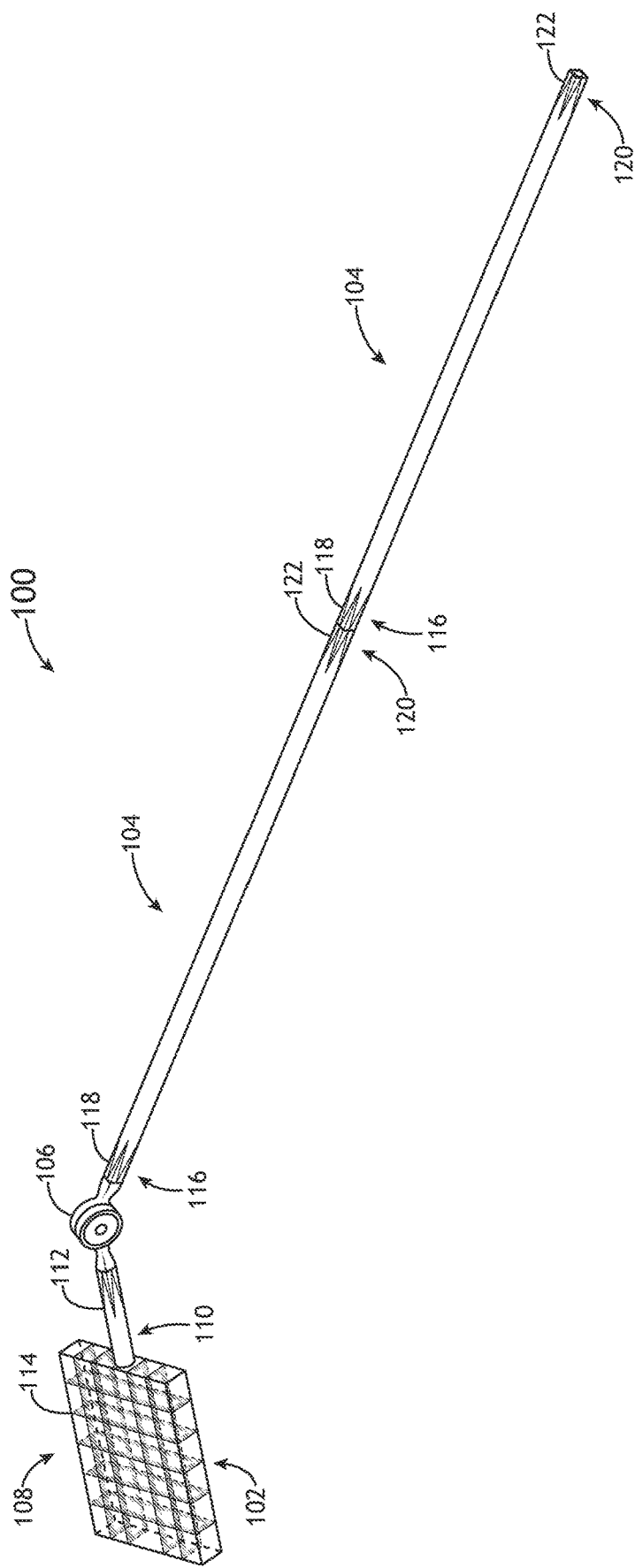
FIG. 1A illustrates an isometric view of an object retrieval device, in accordance with one or more embodiments of the present disclosure.

FIG. 1A generally illustrates an isometric view of an object retrieval device 100, in accordance with one or more embodiments of the present disclosure.

In one embodiment, the object retrieval device 100 includes a retrieval end 102, one or more extension arms 104, and one or more joints 106. For example, a joint 106 may couple a retrieval end 102 to two extension arms 104.

In one embodiment, the retrieval end 102 includes an adhesive portion 108 and an arm portion 110. For example, the retrieval end 102 may include an arm portion 110 that extends from the adhesive portion 108 and is configured to couple with other portions of the object retrieval device 100.

In one embodiment, a raised portion for grasping the object retrieval device is formed by the coupling of a first extension arm 104 with an additional extension arm 104. For example, the second set of protrusions 122 disposed on a first extension arm 104 may align with the protrusions 118 on an additional extension arm 104 when the first extension arm 104 and the additional extension 104 are coupled.

In one embodiment, portions of the object retrieval device 100 include a square shaped perimeter where portions of the object retrieval device 100 couple. For example, the arm portion 110 of the retrieval end 102, the one or more extension arms 104, and the one or more joints 106 may include a square shaped perimeter where each couples to another portion of the object retrieval device 100.

In one embodiment, the adhesive portion 108 of the retrieval end 102 includes at least one face configured in the form of a shape. For example, as shown in FIG. 1A the retrieval end 102 is configured to have at least one face in the shape of a rectangle.

In one embodiment, the adhesive portion 108 includes segmentation. For example, the adhesive portion 108 may include divisions 114 along the surface that divide the adhesive portion 108 into segments. For instance, the adhesive portion 108 may include incisions that extend from the surface into the adhesive portion 108 and divide the surface into segments such that a portion of an object may at least partially be disposed between two or more segments of the adhesive portion 108.

In one embodiment, divisions 114 of the adhesive portion 108 are disposed 1 millimeter to 1.5 inch apart. For example, divisions 114 of the adhesive portion 108 may be disposed 1 millimeter apart. By way of another example, divisions 114 of the adhesive portion 108 may be disposed ¼ inch to ¾ inch apart. For instance, divisions 114 of the adhesive portion 108 may be disposed ¼ or ½ inch apart. By way of another instance, divisions 114 of the adhesive portion 108 may be disposed 1 centimeter apart. It is noted herein that divisions 114 of the adhesive portion 108 may be disposed any length 1 millimeter to 1.5 inch apart.

In one embodiment, the retrieval end 102 is replaced by a second retrieval end 102. For example, a retrieval end 102 may be removed from the object retrieval device 100 and an additional retrieval end 102, having a similar or different shape than the removed retrieval end 102, may replace the removed retrieval end 102. In another embodiment, the adhesive portion 108 is disposable. For example, the adhesive portion 108 of the retrieval end 102 may be used one or more times and then disposed of and replaced by an additional adhesive portion 108. For instance, an adhesive portion 108 of the retrieval end 102 may be used one or more times and then the retrieval end 102 may be disposed of and replaced by an additional retrieval end 102. By way of another instance, an adhesive portion 108 of the retrieval end 102 may be used one or more times and then the adhesive portion 108 may be disposed of and replaced by an additional adhesive portion 108.

In one embodiment, the adhesive portion 108 includes one material. In another embodiment, the adhesive portion 108 includes a plurality of materials. In another embodiment, the adhesive portion 108 includes a base material having a film covering. For example, the adhesive portion 108 may include a base material having a defined shape that includes a film covering. For instance, the adhesive portion 108 may include a rigid or semi-rigid material having a tacky elastomer film covering.

In one embodiment, the adhesive portion 108 includes a tacky elastomer. For example, the adhesive portion 108 may include, but is not limited to, natural rubber, butyl rubber, butadiene rubber, styrene-butadiene rubber, nitrile rubber, silicone, neoprene, nitrocellulose, polyvinyl acetate, vinyl acetate-ethylene copolymer, polyethylene, polypropylene, polyamides, polyesters, acrylics, and cyanoacrylics.

In one embodiment, the adhesive portion 108 of the retrieval end 102 may be washable to restore adhesive properties. For example, the adhesive portion 108 may be made of a material that has adhesive properties that are restored when exposed to water, or exposed to soap and water combined. In another embodiment, the adhesive portion 108 includes an elastomer that is hydrophobic and water-insoluble. For example, the adhesive portion 108 may include, but is not limited to, polyvinyl chloride, a copolymer of vinyl chloride and vinyl acetate, polyurethane, or polysulfide. It is noted herein that a compatible plasticizer may be utilized to obtain desired physical characteristics of the elastomer.

In one embodiment, the object retrieval device 100 is configurable to retrieve a variety of objects. For example, the object retrieval device 100 may be configured to retrieve a small, or a light weight object such as, but not limited to, a pin, a paperclip, a stamp, a photo, a paper, a coin, or a media device (i.e., CD, DVD, Blu-ray disc, or a flash drive). By way of another example, the object retrieval device 100 may be configured to retrieve a large, or a heavy object that could be held in one hand such as, but not limited to, a set of keys, a mobile phone, a softball, a camera, a digital device, a screwdriver, a wrench, a remote control, a book, a pair of eye glasses, or a medication container. In another embodiment, the object retrieval device 100 can lift and retrieve an object weighting 3-7 lbs. For example, the object retrieval device 100 may lift and retrieve an object that weighs 4-6 lbs. For instance, the object retrieval device 100 may lift and retrieve an object that weighs 5 lbs.

Figure 1B:
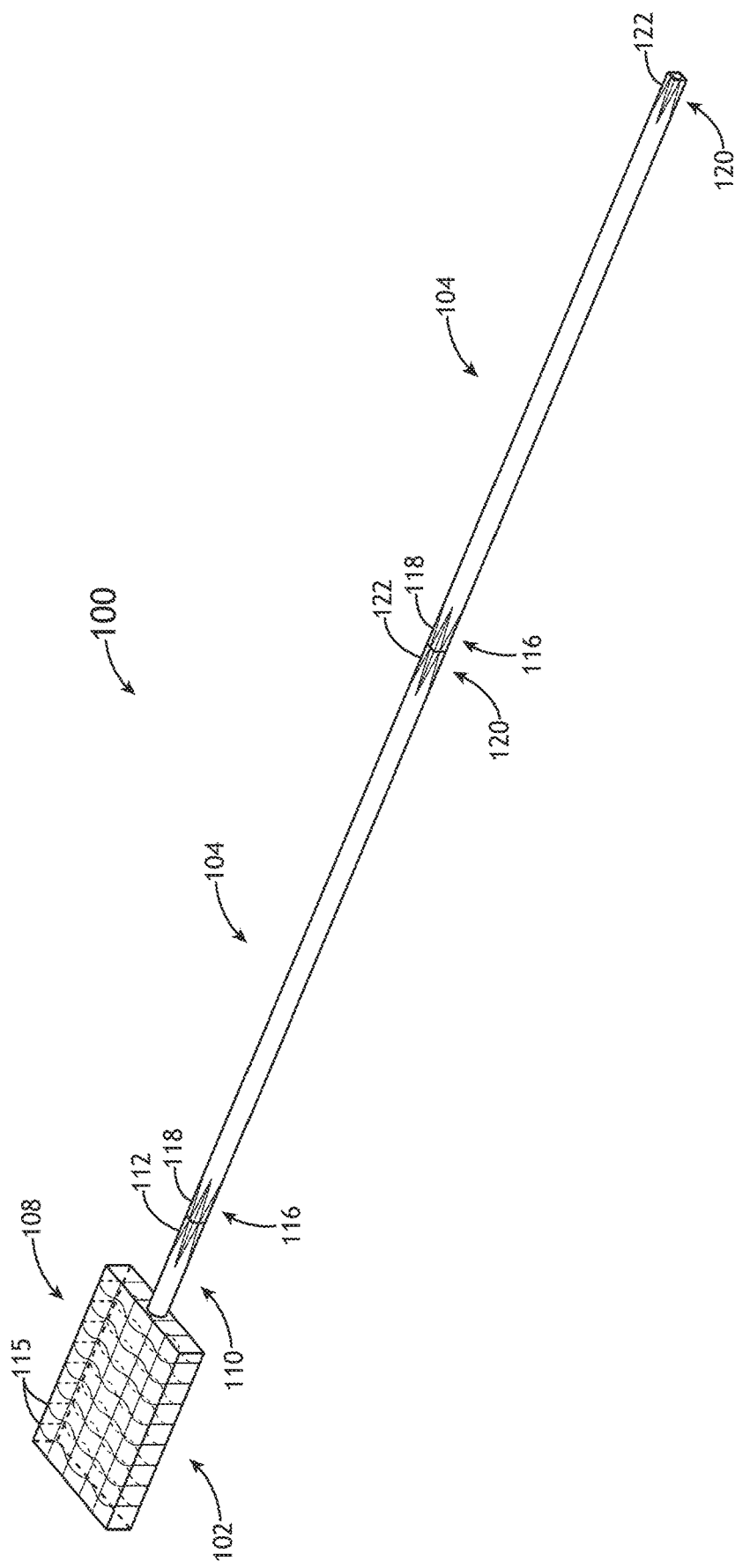
FIG. 1B illustrates an isometric view of an object retrieval device, in accordance with one or more embodiments of the present disclosure.

FIG. 1B generally illustrates an isometric view of an object retrieval device, in accordance with one or more embodiments of the present disclosure. In one embodiment, a retrieval end 102 is coupled to an extension arm 104. For example, the arm portion 110 of the retrieval end 102 may couple to a first end 116 of an extension arm 104.

In another embodiment, a plurality of extension arms 104 are coupled and one of the plurality of extension arms 104 is coupled to a retrieval end 102. For example, two or more extension arms 104 may be coupled and couple to the retrieval end 102 to extend the reach of the object retrieval device 100.

In one embodiment, the arm portion 110 of the retrieval end 102 includes protrusions 112. For example, protrusions 112 may be disposed at the end of the arm portion 110 of the retrieval end 102. For instance, protrusions 112 may rise from the arm portion 110 as they approach the distal end of the arm portion 110. By way of another instance, the protrusions 112 rise as they approach the distal end of the arm portion 110 until a width of a side joining two adjacent protrusions 112 is equal to the diameter of the arm portion 110. In another embodiment, the sides of adjacent protrusions 112 disposed on the distal end of the arm portion 110 are configured to form a square that inscribes the circumference of the extension arm 104. For example, each side of the square that inscribes the distal end of the arm portion 110 is equal to the diameter of the extension arm 110.

In one embodiment, a raised portion for grasping the object retrieval device is formed by the coupling of an extension arm 104 and a retrieval end 102. For example, the first set of protrusions 118 disposed on a first extension arm 104 may align with the protrusions 112 on the arm portion 110 of the retrieval end 102 when a first extension arm 104 and a retrieval end 102 are coupled.

In one embodiment, the adhesive portion 108 is textured. In another embodiment, the adhesive portion 108 includes a raised pattern on the surface. For example, the adhesive portion 108 may have at least one of, but not limited to, raised lines or grooves oriented lengthwise, widthwise, or at a diagonal to the edge along at least a portion of the adhesive portion 108. For instance, as shown in FIG. 1B, the adhesive portion 108 is textured with raised features 115 of parallel and wavy lines. It is noted herein that raised features on the adhesive portion of the retrieval end are thought to improve adhesion to an object.

In one embodiment, raised features 115 on the adhesive portion 108 are disposed 1 millimeter to 1.5 inch apart. For example, raised features 115 of the adhesive portion 108 may be disposed 1 millimeter apart. By way of another example, raised features 115 of the adhesive portion 108 may be disposed ¼ inch to ¾ inch apart. For instance, the spacing of raised features 115 of the adhesive portion 108 may be disposed ¼ or ½ inch apart. By way of another instance, raised features 115 of the adhesive portion 108 may be disposed 1 centimeter apart. It is noted herein that the raised features 115 of the adhesive portion 108 may be disposed at any distance 1 millimeter to 1.5 inch apart.

Figure 1C:
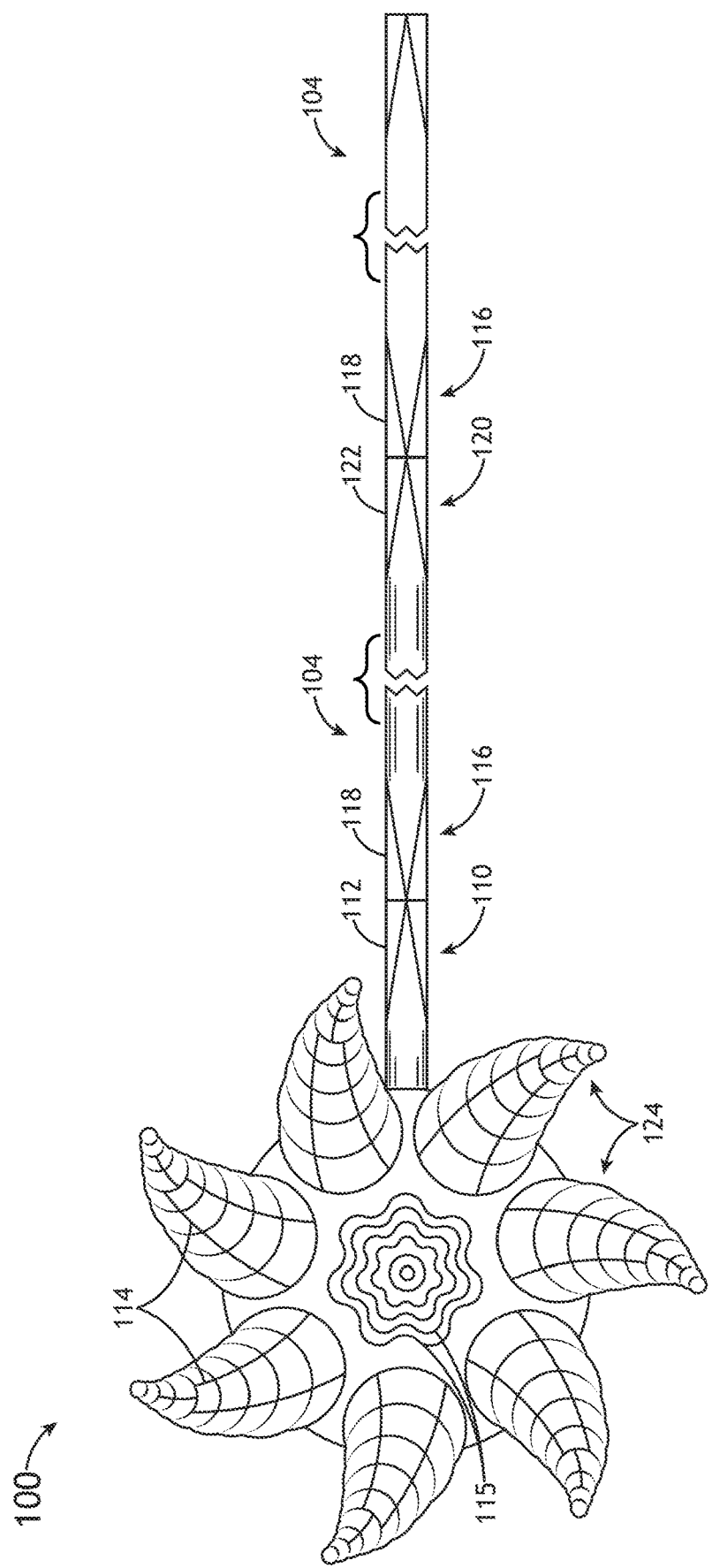
FIG. 1C illustrates a bottom view of an object retrieval device, in accordance with one or more embodiments of the present disclosure.

FIG. 1C generally illustrates a bottom view of an object retrieval device, in accordance with one or more embodiments of the present disclosure.

In one embodiment, the adhesive portion 108 is configured as a plurality of tentacles 124 disposed in a radial pattern that extends perpendicularly from the retrieval end 102. For example, the adhesive portion 108 may be configured as 6-8 tentacles 124 disposed in a radial pattern and extending perpendicularly from the retrieval end 102. For instance, the adhesive portion 108 may be configured as 7 tentacles 124 disposed in a radial pattern and extending perpendicularly from the retrieval end 102. In another embodiment, the tentacles 124 extend perpendicularly from the retrieval end 102 in a spiraling pattern. For example, the tentacles 124 may form a pattern that radially spirals clockwise or counter-clockwise from the center of the adhesive portion 108.

In one embodiment, the adhesive portion 108 is configured with divisions 114 and raised surface features 115. For example, the tentacles 124 may include divisions 114 while the base of the adhesive portion 108 includes raised surface features 115. For instance, the tentacles 124 may include divisions that run at least a portion of the length of the tentacles while the base of the adhesive portion 108 may include various sized circles and blossoms that encompass one another.

Figure 2A:
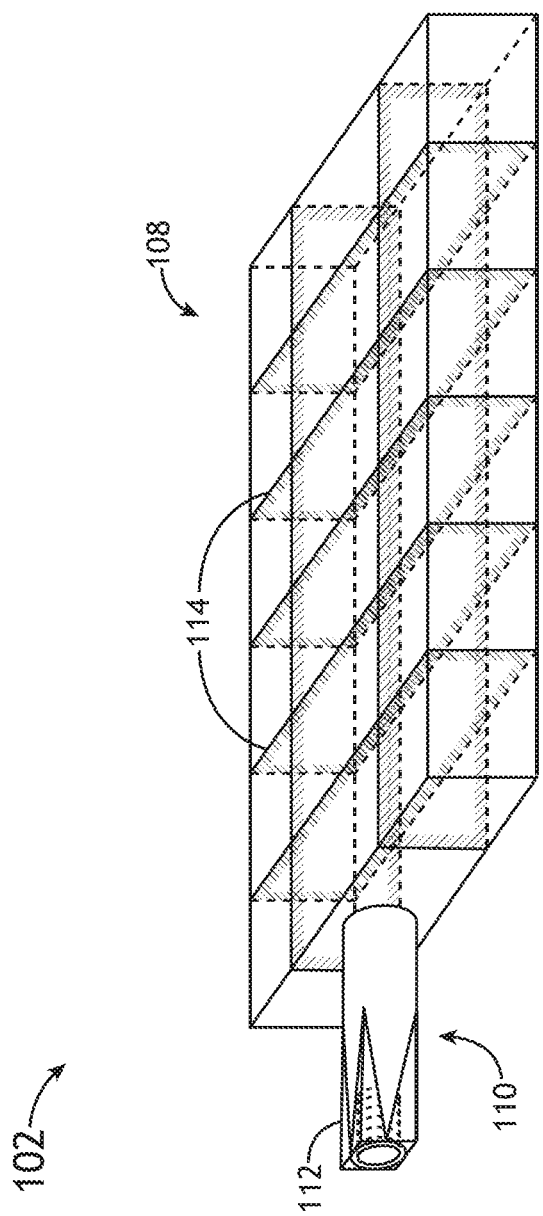
FIG. 2A illustrates an isometric view of a retrieval end of an object retrieval device, in accordance with one or more embodiments of the present disclosure.

FIG. 2A generally illustrates an isometric view of a retrieval end 102 of an object retrieval device 100, in accordance with one or more embodiments of the present disclosure. In one embodiment, the adhesive portion 108 of the retrieval end 102 is configured to have at least one face in the shape of a rectangle.

In one embodiment, the adhesive portion 108 of the retrieval end 102 includes segmentation. For example, the adhesive portion 108 may include divisions 114 along the surface that divide the adhesive portion 108 into segments. For instance, the adhesive portion 108 may include horizontal and/or vertical divisions 114 that divide the surface of the adhesive portion 108 into segments. By way of another instance, the adhesive portion may include diagonal, dashed, wavy, curved, or circular divisions that divide the surface into segments. It is noted herein that surface segmentation is thought to increase adhesion between the adhesive portion 108 and an object when part of an object is disposed between two or more segments of the adhesive portion 108.

Figure 2B:
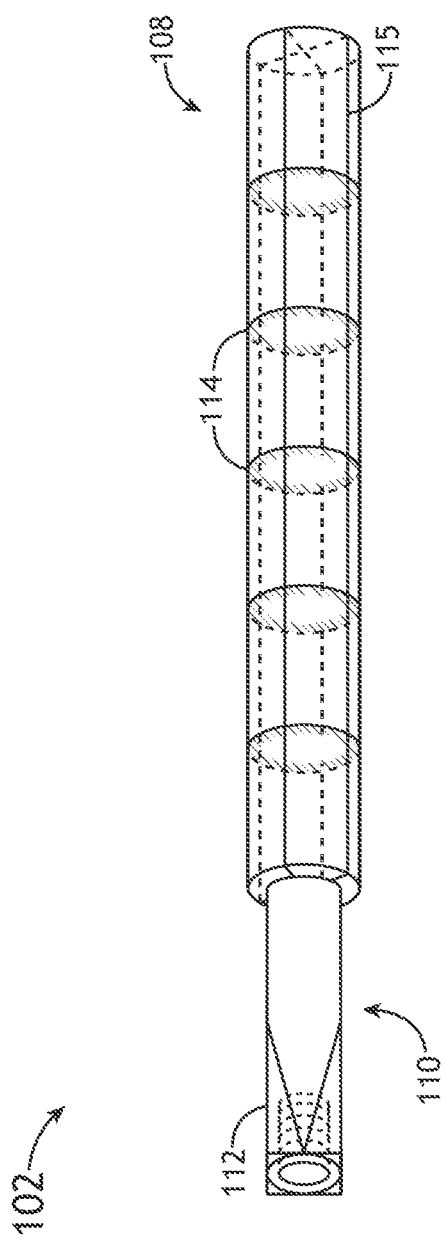
FIG. 2B illustrates an isometric view of a retrieval end of an object retrieval device, in accordance with one or more embodiments of the present disclosure.

FIG. 2B generally illustrates an isometric view of a retrieval end 102 of an object retrieval device 100, in accordance with one or more embodiments of the present disclosure. In one embodiment, the adhesive portion 108 of the retrieval end 102 is configured in the shape of a cylinder. In another embodiment, the adhesive portion 108 includes divisions 114 and raised surface features 115. For example, as shown in FIG. 2B raised surface features 115 may be disposed in a longitudinal direction along the adhesive portion 108 while divisions 114 separate or segment the adhesive portion 108 in a direction perpendicular to the raised surface features 115.

Figure 2C:
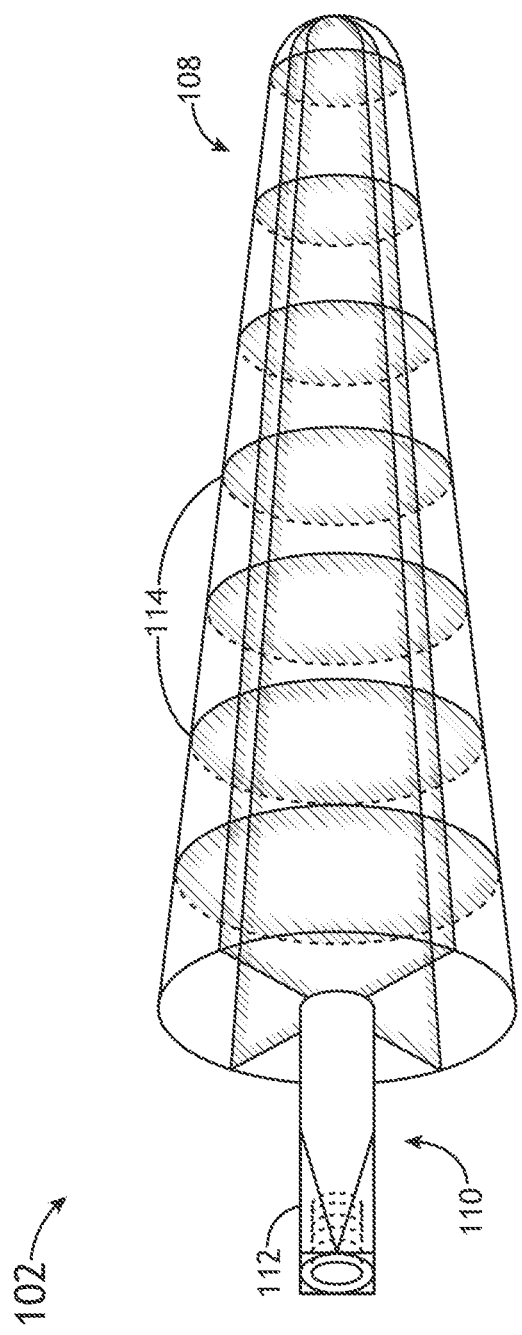
FIG. 2C illustrates an isometric view of a retrieval end of an object retrieval device, in accordance with one or more embodiments of the present disclosure.

FIG. 2C generally illustrates an isometric view of a retrieval end 102 of an object retrieval device 100, in accordance with one or more embodiments of the present disclosure. In one embodiment, as shown in FIG. 2C the adhesive portion 108 of the retrieval end 102 is configured in the shape of a rounded top cone. In another embodiment, divisions 114 segment or separate the adhesive portion 108 along two perpendicular directions.

Figure 2D:
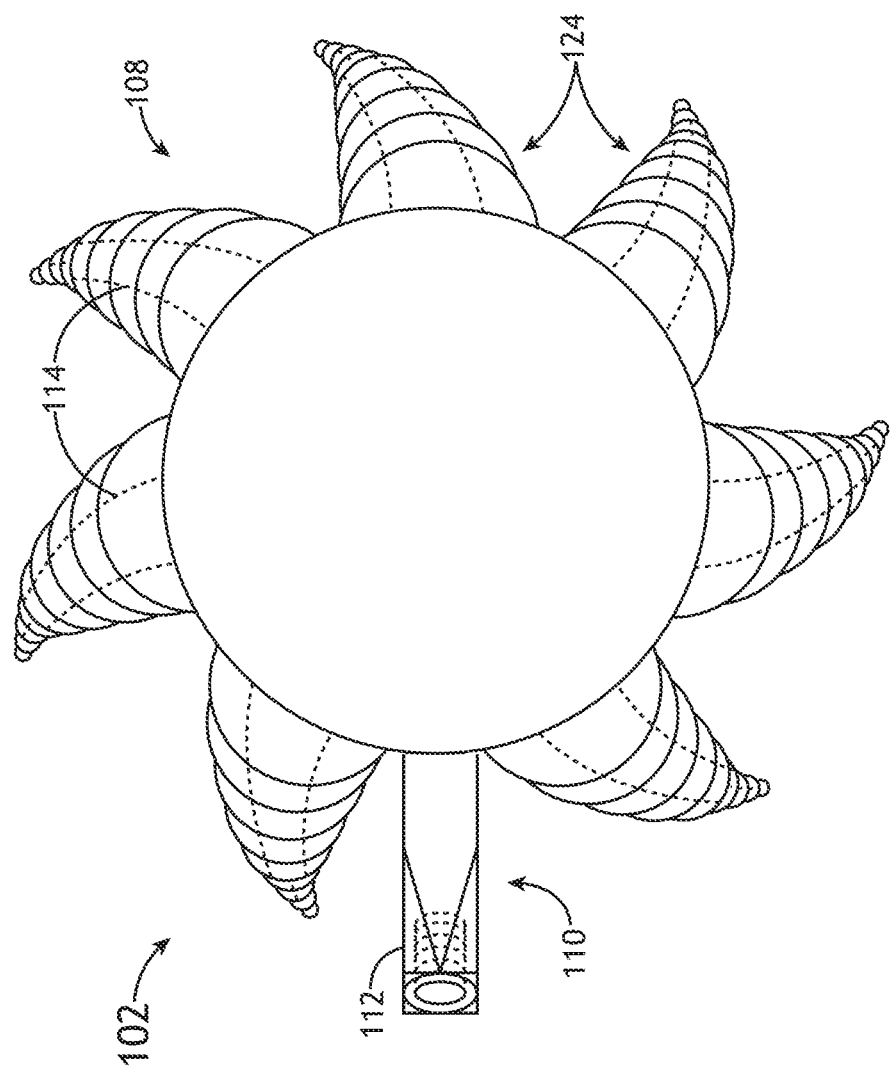
FIG. 2D illustrates a top view of a retrieval end of an object retrieval device, in accordance with one or more embodiments of the present disclosure.

FIG. 2D generally illustrates a top view of the retrieval end 102 of an object retrieval device 100, in accordance with one or more embodiments of the present disclosure. In one embodiment, the adhesive portion 108 of the retrieval end 102 is configured in the shape of a plurality of tentacles. In another embodiment, a plurality of tentacles are disposed about the perimeter of the retrieval end 102 of an object retrieval device 100. For example, 3-9 tentacles may be placed around the perimeter of the retrieval end 102. For instance, 7 tentacles may be placed around the perimeter of the retrieval end 102.

Referring to FIGS. 2A-2D, the adhesive portion 108 of the retrieval end 102 includes at least one face configured in the form of a shape (i.e., a circle, an oval, a rectangle, a cylinder, a cone, a rounded top cone, a fan, a foot of a gecko, or a plurality of tentacles). It is noted herein that a retrieval end 102 including at least one face configured in the form of a shape may aid in recovery of an object by increasing adhesion of the retrieval end 102 with an object.

In one embodiment, the adhesive portion 108 is smooth. For example, at least a portion of the adhesive portion may be smooth and void of roughness or surface features.

In one embodiment, the adhesive portion 108 is textured with surface features 115. For example, the adhesive portion 108 of the retrieval end 102 may be textured with surface features 115 that includes, but are not limited to, lines, dimples, grooves, terraces, ridges, or plateaus. For instance, the adhesive portion 108 of the retrieval end 102 may be textured with surface features 115 including the plateaus of a gecko foot. In another embodiment, the adhesive portion 108 includes a roughened surface.

In another embodiment, the adhesive portion 108 includes a patterned surface. For example, the adhesive portion 108 may have raised lines or grooves oriented lengthwise, widthwise, or at a diagonal to the edge along at least a portion of the adhesive portion 108. By way of another example, the adhesive portion 108 may have raised lines or grooves oriented in a segmented line, a curved line, a wavy line, or a shape (i.e., circle, oval, square, rectangle, or blossom). It is further noted herein that surface features located on the adhesive portion 108 of the object retrieval device 100 are thought to aid in adhesion of the adhesive portion 108 to an object.

In one embodiment, an edge of the adhesive portion 108 includes protrusions. For example, a surface of the adhesive portion 108 may be edged with one or more of a fray, a tassel, a ridge, or a curtain. By way of another example, divisions 114 of the adhesive portion 108 may be disposed 1-4 millimeters apart. For instance, divisions 114 of the adhesive portion 108 may be disposed 2 millimeters apart to dispose fray protrusions on the surface of the adhesive portion 108. It is noted herein that edging of a surface is thought to increase surface area of the adhesive portion 108 and increase adhesion of the adhesive portion 108 to an object. In another embodiment, the edge of a textured surface includes perforations. It is further noted herein that it is thought that a perforated edge of a surface may increase adhesion of the adhesive portion 108 to an object.

In one embodiment, the arm portion 110 of a retrieval end 102 includes a diameter width of ⅛ to ½ inch. For example, the arm portion 110 of a retrieval end 102 may include a width of ⅜ inch in diameter. By way of another example, the arm portion 110 of a retrieval end 102 may include a width of ¼ inch in diameter.

Figure 3A:
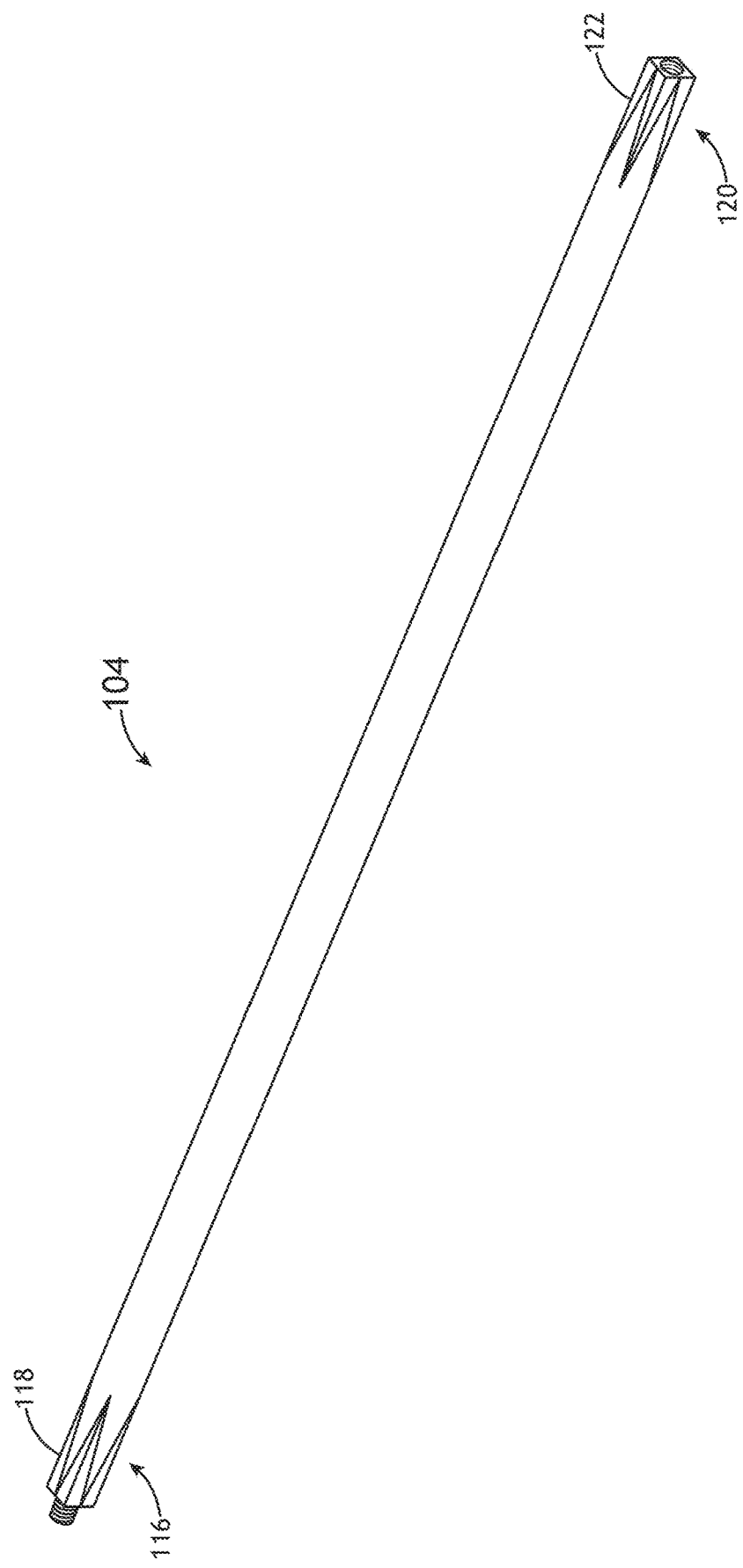
FIG. 3A illustrates an isometric view of an extension arm of an object retrieval device, in accordance with one or more embodiments of the present disclosure.

FIG. 3A generally illustrates an isometric view of an extension arm 104 of an object retrieval device 100, in accordance with one or more embodiments of the present disclosure. In one embodiment, each of the one or more extension arms 104 include a first end 116 that includes a first set of protrusions 118. In another embodiment, each of the one or more extension arms 104 include a second end 120 that includes a second set of protrusions 122.

Figure 3B:
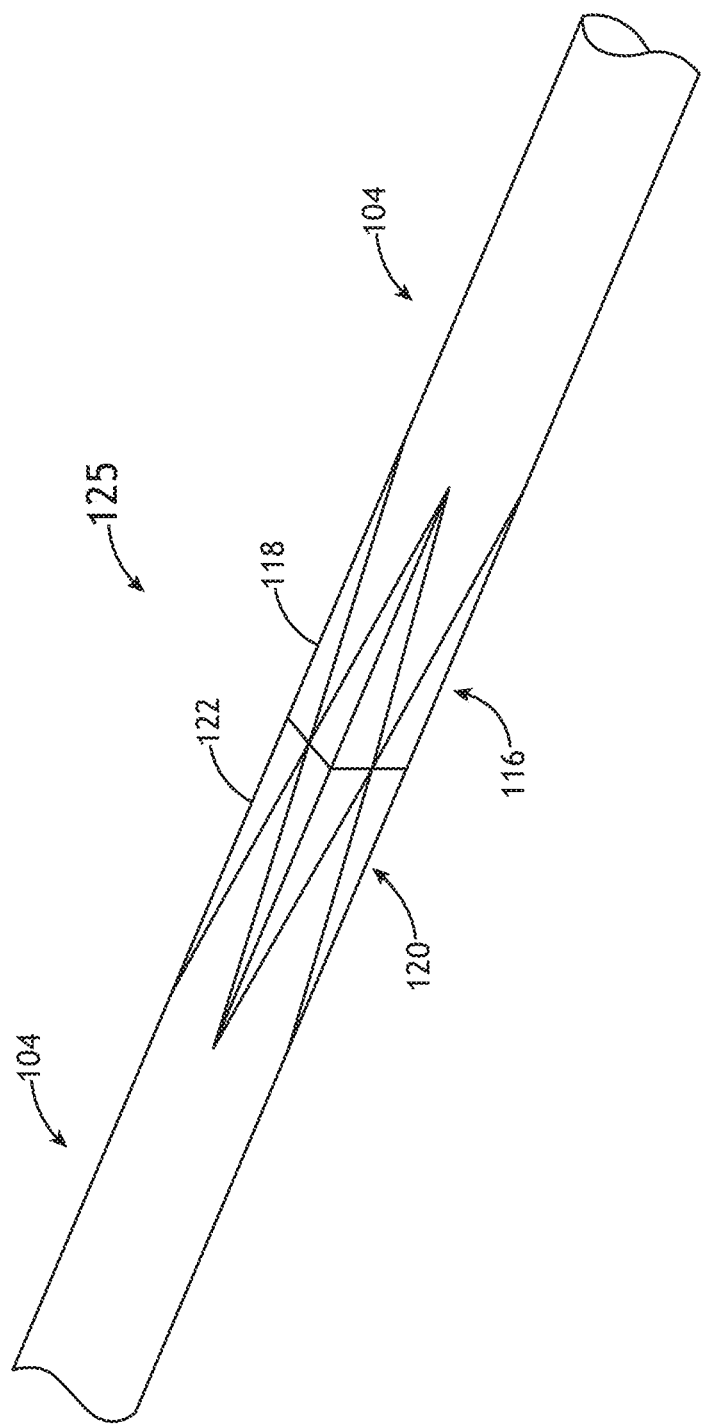
FIG. 3B illustrates an isometric view of the coupling of two extension arms, in accordance with one or more embodiments of the present disclosure.

FIG. 3B generally illustrates an isometric view of the coupling of two extension arms 104, in accordance with one or more embodiments of the present disclosure. In one embodiment, the second end 120 of an extension arm 104 is coupled to the first end 116 of an additional extension arm 104.

In one embodiment, the summits of the second set of protrusions 122 disposed on a first extension arm 104 align with the summits of the first set of protrusions 116 on the additional extension arm 104 when the first extension arm 104 and the additional extension arm 104 are coupled. In another embodiment, the second set of protrusions 122 disposed on a first extension arm 104 and the first set of protrusions 118 disposed on the additional extension arm 104 form a set of ridges 125 for grasping the object retrieval device 100 when the first extension arm 104 and the additional extension arm 104 are coupled. For example, the second set of protrusions 122 disposed on a first extension arm 104 and the first set of protrusions 118 disposed on an additional extension arm 104 each contribute half of the protrusions that form the set of ridges 125 for grasping the object retrieval device 100 when the first extension arm 104 and the additional extension arm 104 are coupled. For instance, the second set of protrusions 122 disposed on the first extension arm 104 and the first set of protrusions 118 on the additional extension arm 104 combine to form a set of ridges 125 when the summits of the two sets of protrusions 122, 118 are aligned.

In one embodiment, the extension arms 104 include a diameter width of ⅛ to ½ inch. For example, the extension arms may include a width of ⅜ inch in diameter. By way of another example, the extension arms may include a width of ¼ inch in diameter.

Figure 4:
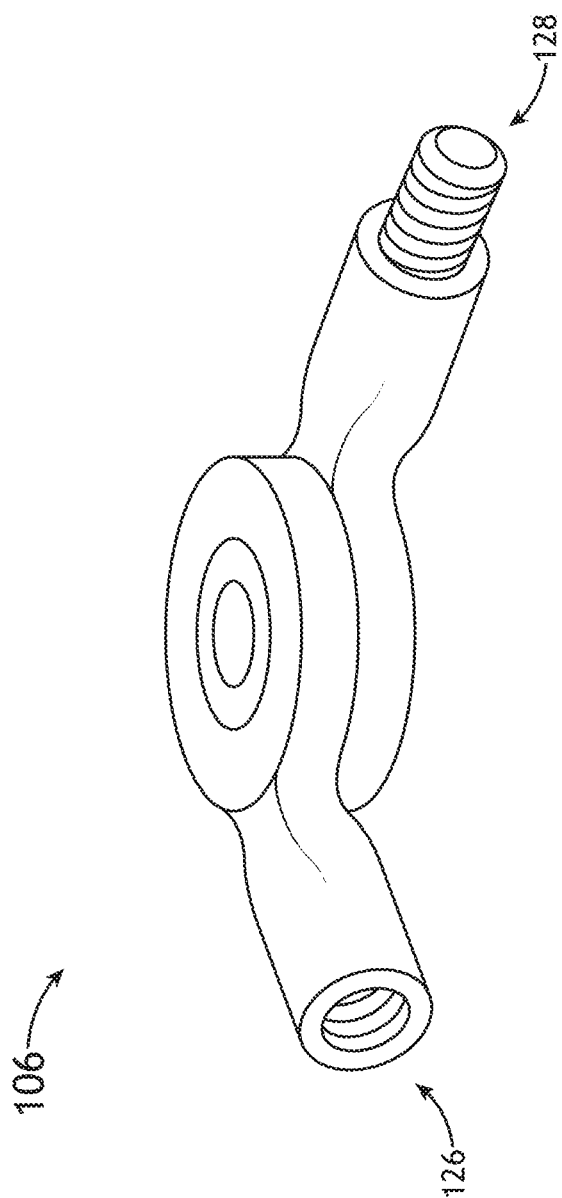
FIG. 4 illustrates an isometric view of a hinge attachment of an object retrieval device, in accordance with one or more embodiments of the present disclosure.
Figure 5A:
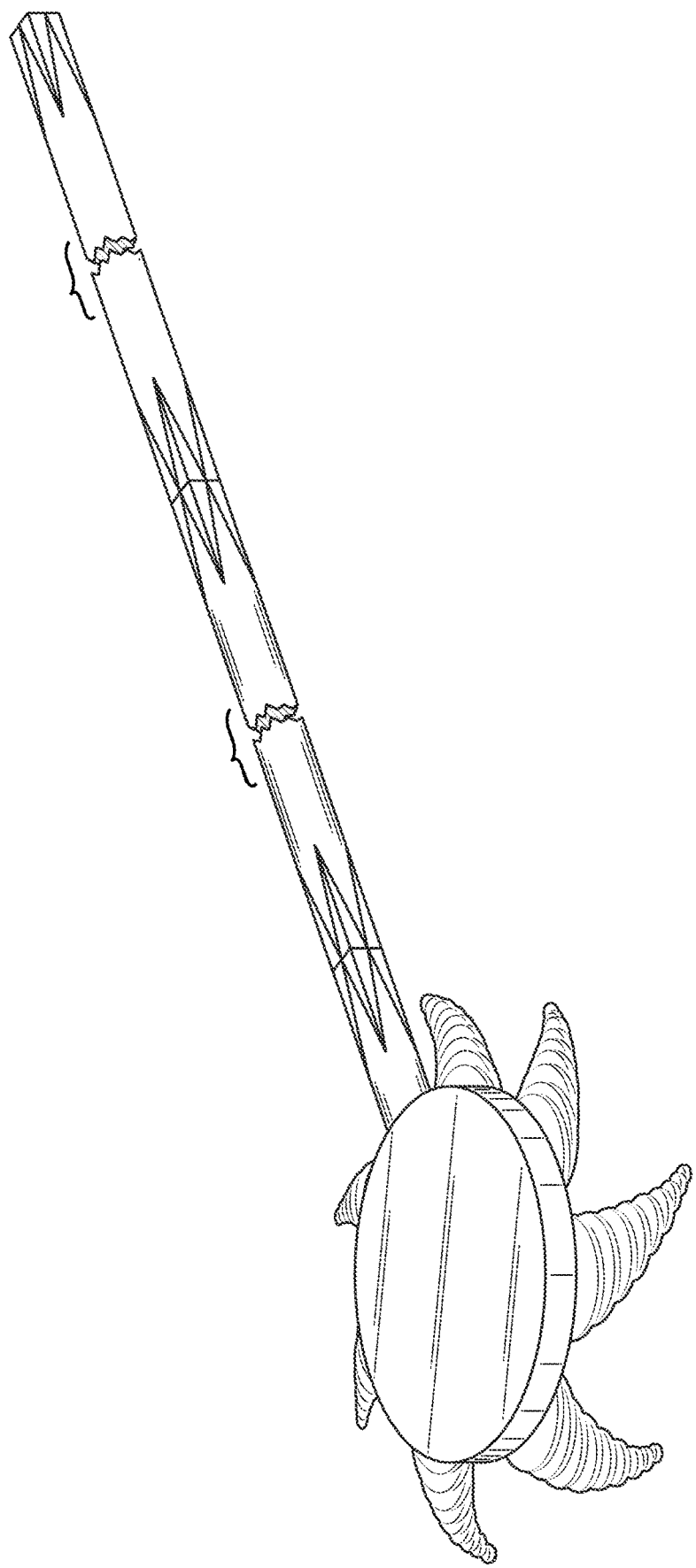
FIG. 5A illustrates a front perspective view of an object retrieval device, in accordance with one or more embodiments of the present disclosure.
Figure 5B:
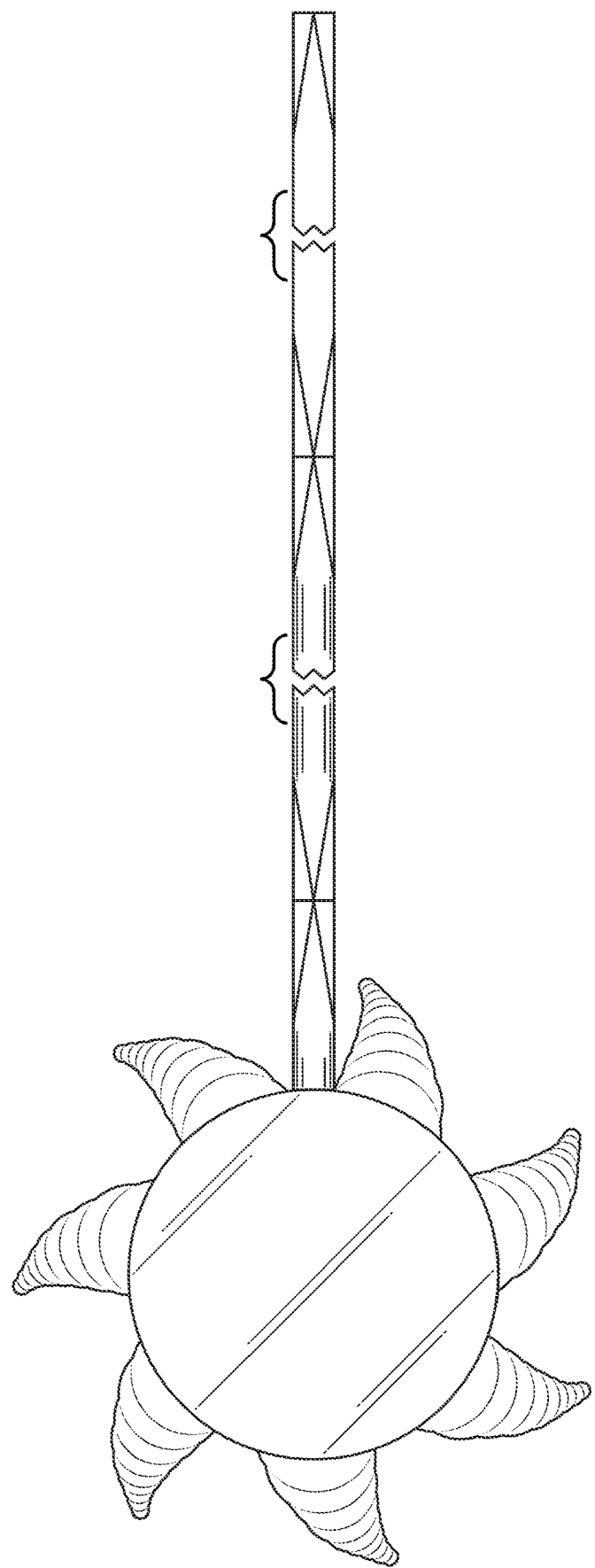
FIG. 5B illustrates a top plan view of an object retrieval device, in accordance with one or more embodiments of the present disclosure.
Figure 5C:
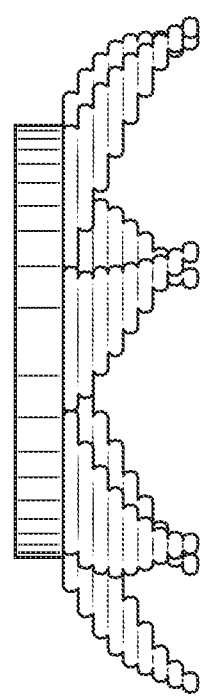
FIG. 5C illustrates a front elevational view of an object retrieval device, in accordance with one or more embodiments of the present disclosure.
Figure 5D:
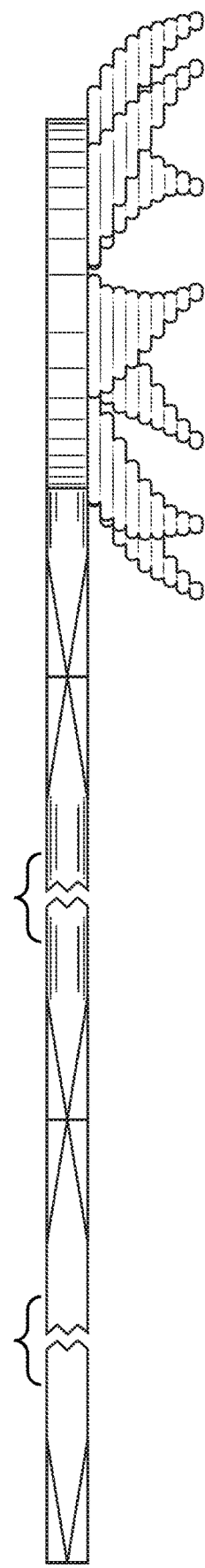
FIG. 5D illustrates a right side elevational view of an object retrieval device, in accordance with one or more embodiments of the present disclosure.
Figure 5E:
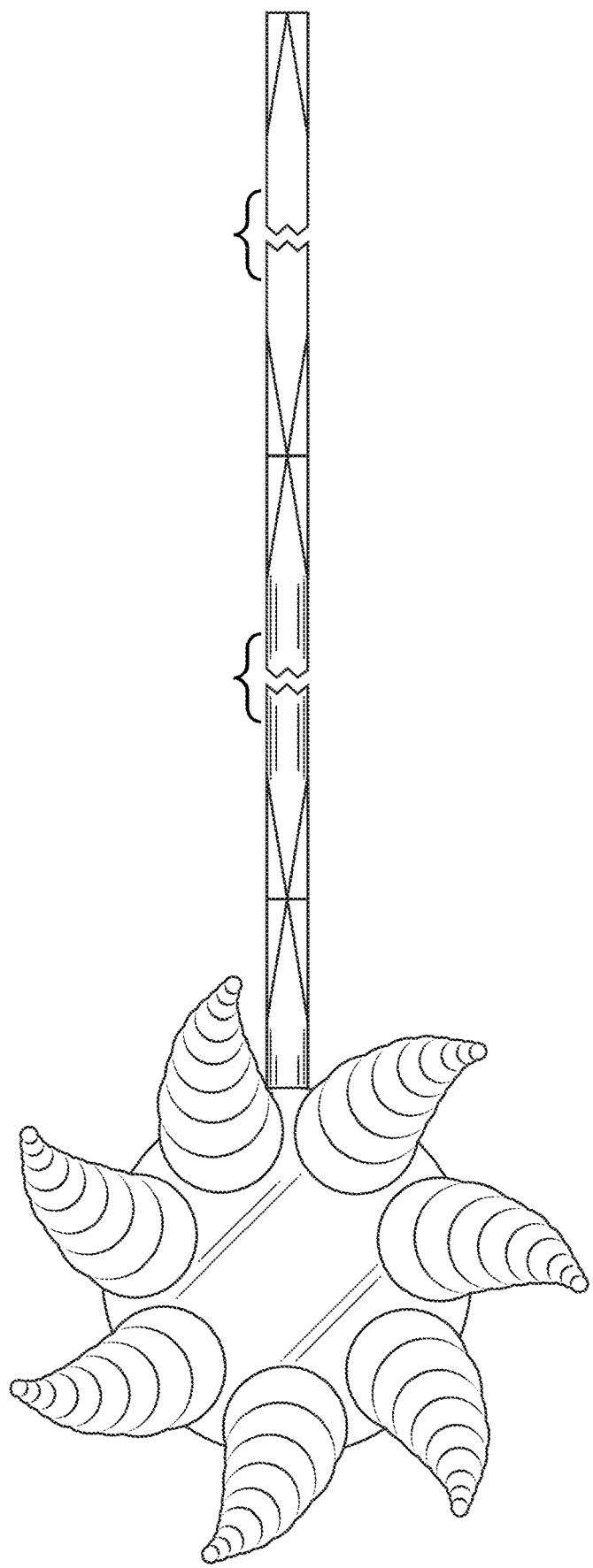
FIG. 5E illustrates a bottom plan view of an object retrieval device, in accordance with one or more embodiments of the present disclosure.
Figure 5F:
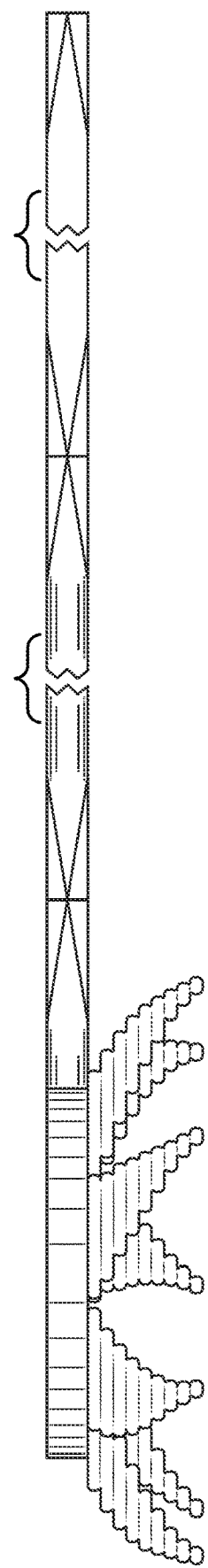
FIG. 5F illustrates a left side elevational view of an object retrieval device, in accordance with one or more embodiments of the present disclosure.
Figure 5G:
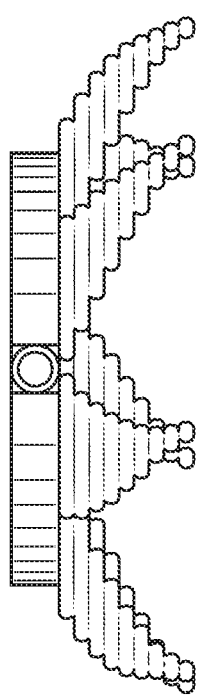
FIG. 5G illustrates a rear elevational view of an object retrieval device, in accordance with one or more embodiments of the present disclosure.
Figure 5H:
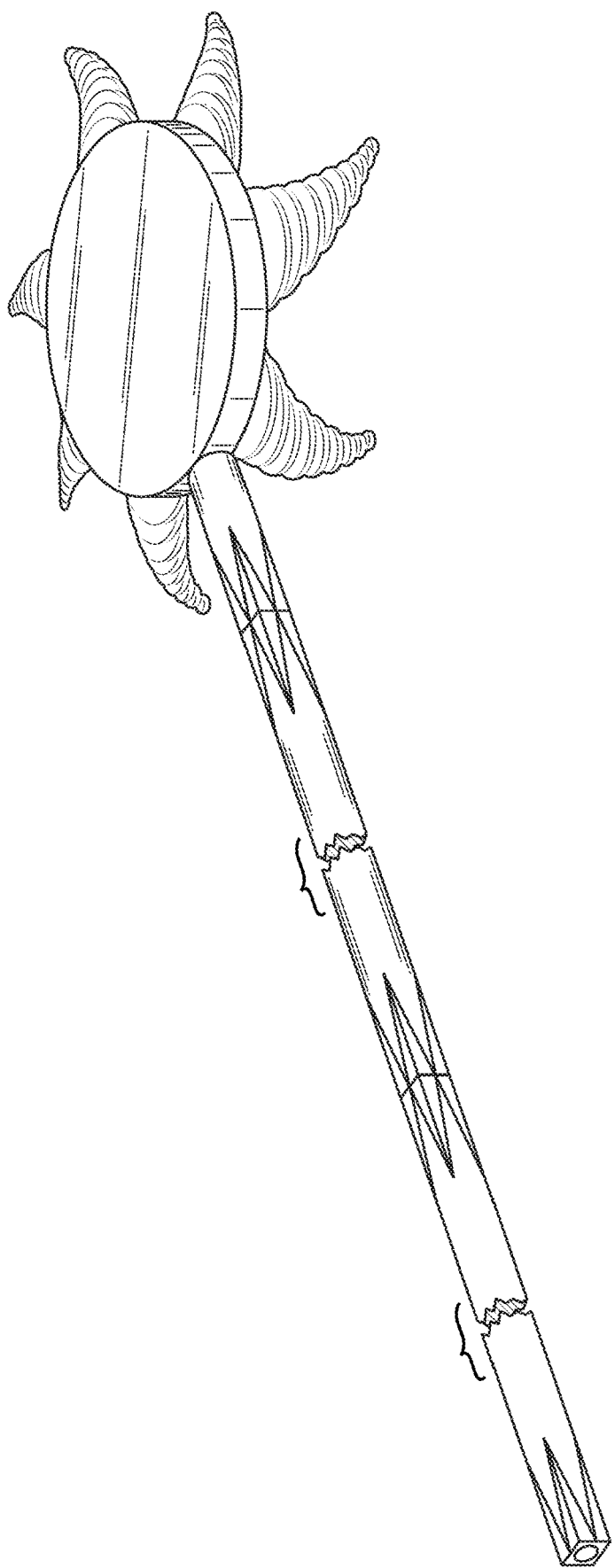
FIG. 5H illustrates a back perspective view of an object retrieval device, in accordance with one or more embodiments of the present disclosure.

FIG. 4 generally illustrates an isometric view of a joint 106 of an object retrieval device 100, in accordance with one or more embodiments of the present disclosure. In one embodiment, the joint 106 includes a female end 126 and a male end 128.

In one embodiment, a joint 106 includes a circular shaped perimeter where the joint 106 couples to other portions of the object retrieval device 100. For example, a joint 106 may include a circular shaped perimeter where the joint 106 couples to one or more extension arms 104 that include a square shaped perimeter. By way of another example, a joint 106 couples to a retrieval end 102 that includes a square shaped perimeter.

In one embodiment, the one or more joints 106 include motion in one plane. For example, the one or more joints 106 may be any of, but not limited to, a hinge joint, a knuckle joint, a pin joint or a saddle joint.

In one embodiment, the one or more joints 106 include motion in more than one plane. For example, the one or more joints 106 may be any of, but not limited to, a universal joint or a ball and socket joint.

In one embodiment, the joint 106 includes one or more locking positions to secure the joint 106 in a fixed position after adjustment to a desired angle. For example, the joint 106 may lock at a fixed position once the joint 106 has been adjusted to a desired multiple of 10 degrees from 0-90 degrees. By way of another example, the joint 106 may lock at a fixed position once the joint 106 has been adjusted to a desired multiple of 15 degrees from 0-90 degrees.

In another embodiment, the joint 106 couples a retrieval end 102 to an extension arm 104. For example, the male end 128 of the joint 106 may couple to the arm portion 110 of the retrieval device 100 while the female end 126 of the joint 106 couples to the male end 116 of an extension arm 104.

In one embodiment, the joint 106 couples a first extension arm 104 to an additional extension arm 104. For example, the male end 128 of the joint 106 may couple to a first extension arm 104 while the female end 126 of the joint 106 couples to an additional extension arm 104.

In one embodiment, a plurality of extension arms 104 are coupled to a plurality of joints 106 and one of the plurality of extension arms 104 or one of the plurality of joints 106 is coupled to a retrieval end 102. For example, two joints 106 may couple three extension arms 104 to a retrieval end 102. For instance, two joints 106 may couple an extension arm 104 to two additional extension arms 104 such that the extension arm 104, two joints 106, and two additional extension arms 104 are coupled to a retrieval end 102. It is noted herein that a plurality of extension arms 104 and a plurality of joints 106 provide adjustability of the object retrieval device 100 to position the retrieval end 102 as is necessary or desired to retrieve an object. It is further noted herein that any number of extension arms 104 and joints 106 may be coupled to a retrieval end 102 and utilized to retrieve an object.

FIG. 5A-5H illustrate various views of an object retrieval device 100, in accordance with one or more embodiments of the present disclosure. More specifically FIG. 5A-5H illustrate various views of a retrieval end 102 configured with an adhesive portion 108 in the shape of a plurality of tentacles 124 coupled to a first extension arm 104 that is coupled to an additional extension arm 104.

FIG. 5A-5H illustrate a surface of the adhesive portion 108 of the retrieval end 102 that is smooth. For example, the base of the adhesive portion or the tentacles do not include any divisions 114 or surface features 115.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. An object retrieval device comprising:
    a retrieval end, wherein the retrieval end includes an adhesive portion and an arm portion, wherein the arm portion includes a set of protrusions, wherein the adhesive portion includes surface segmentation;
    a joint, wherein the joint is configurable to pivot; and
    an extension arm, wherein the extension arm includes a first set of protrusions disposed at a first end of the extension arm, wherein the first end of the extension arm is couplable to the arm portion of the retrieval end such that the first set of protrusions disposed on the extension arm align with the set of protrusions disposed on the arm portion of the retrieval end to form ridges, wherein the adhesive portion includes a plurality of tentacles, wherein the plurality of tentacles extend perpendicularly from the retrieval end and spiral to a radial distance from a center of the adhesive portion that is larger than a radial distance of a base of the tentacles from the center of the adhesive portion.

2. The object retrieval device of claim 1, wherein the surface segmentation extends below a surface of the adhesive portion.

3. The object retrieval device of claim 1, wherein the retrieval end is configurable to be coupled with one or more extension arms and one or more joints.

4. The object retrieval device of claim 3, wherein the extension arm include a second set of protrusions at a second end of the extension arm.

5. The object retrieval device of claim 4, wherein the first set of protrusions and the second set of protrusions form a cross section of the extension arm equal to a diameter of the extension arm.

6. The object retrieval device of claim 5, wherein extension arm include a diameter of ⅛ to ½ inches.

7. The object retrieval device of claim 6, wherein the extension arm include a diameter of ¼ inch.

8. The object retrieval device of claim 1, wherein the joint is configurable to pivot at least 45 degrees.

9. The object retrieval device of claim 8, wherein the joint is configurable to lock in a position at multiples of 15 degrees from 0 to 45 degrees.

* * * * *